(12) United States Patent
Ge

(10) Patent No.: US 8,782,853 B2
(45) Date of Patent: Jul. 22, 2014

(54) ROTATING MECHANISM AND ELECTRONIC DEVICE WITH SAME

(71) Applicants: Fu Tai Hua Industry (Shenzhen) Co., Ltd., Shenzhen (CN); Hon Hai Precision Industry Co., Ltd., New Taipei (TW)

(72) Inventor: Hai-Qian Ge, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/778,150

(22) Filed: Feb. 27, 2013

(65) Prior Publication Data

US 2013/0219661 A1    Aug. 29, 2013

(30) Foreign Application Priority Data

Feb. 28, 2012   (CN) .......................... 2012 1 0046652

(51) Int. Cl.
*E05D 7/00* (2006.01)
*E05D 3/10* (2006.01)

(52) U.S. Cl.
USPC ........ 16/354; 16/367; 455/575.3; 248/292.12

(58) Field of Classification Search
USPC .......................... 16/366, 354, 367; 455/575.3; 379/433.11, 433.13; 248/291.1, 248/292.12, 292.13; 403/93, 94
See application file for complete search history.

(56) References Cited

U.S. PATENT DOCUMENTS

| | | | | |
|---|---|---|---|---|
| 4,916,926 A * | 4/1990 | Shieh | ............................... | 70/135 |
| 5,987,704 A * | 11/1999 | Tang | ................................ | 16/354 |
| 6,191,937 B1 * | 2/2001 | Bang | ........................ | 361/679.23 |
| 6,832,412 B2 * | 12/2004 | Kim | ................... | 16/354 |
| 6,926,546 B2 * | 8/2005 | Kurokawa | ...................... | 439/165 |
| 7,328,484 B2 * | 2/2008 | Salice | ............................ | 16/354 |
| 7,362,373 B2 * | 4/2008 | Tsai | ............................. | 348/376 |
| 7,414,834 B2 * | 8/2008 | Ukonaho et al. | ......... | 361/679.55 |
| 7,765,644 B2 * | 8/2010 | Ueyama et al. | ................. | 16/354 |
| 7,832,058 B2 * | 11/2010 | Wang et al. | ..................... | 16/367 |
| 7,894,865 B2 * | 2/2011 | Kim | .......................... | 455/575.3 |
| 8,091,180 B2 * | 1/2012 | Wang et al. | ..................... | 16/367 |
| 8,104,144 B2 * | 1/2012 | Wang et al. | ..................... | 16/354 |
| 8,205,305 B2 * | 6/2012 | Wang et al. | ..................... | 16/354 |
| 8,224,206 B2 * | 7/2012 | Kang | ........................... | 399/122 |
| 8,376,300 B2 * | 2/2013 | Nishida et al. | ............... | 248/304 |
| 8,474,101 B2 * | 7/2013 | Wang et al. | ..................... | 16/366 |
| 8,474,102 B2 * | 7/2013 | Wang et al. | ..................... | 16/367 |
| 2005/0050686 A1 * | 3/2005 | Kurokawa | ...................... | 16/354 |

(Continued)

*Primary Examiner* — Victor Batson
*Assistant Examiner* — Jason W San
(74) *Attorney, Agent, or Firm* — Novak Druce Connolly Bove + Quigg LLP

(57) ABSTRACT

A rotating mechanism for rotatably connecting a first main body with a second main body includes a main gear connected to the first main body, a pair of auxiliary gears connected to the second main body, and a connecting piece. The connecting piece includes a connecting part and a positioning part perpendicularly extending from a middle of the connecting part. The positioning part is located between the pair of auxiliary gears with two opposite ends of the positioning part rotatably connected to the pair of auxiliary gears correspondingly. An end of the connecting part away from the positioning part is connected to the main gear to allow the main gear to contact with the auxiliary gears. The first teeth engage with the second teeth to make the first main body rotate relatively about the second main body.

19 Claims, 11 Drawing Sheets

(56) References Cited

U.S. PATENT DOCUMENTS

| | | | |
|---|---|---|---|
| 2006/0210060 A1* | 9/2006 | Ishikawa et al. | 379/433.13 |
| 2006/0288533 A1* | 12/2006 | Lee | 16/330 |
| 2007/0084015 A1* | 4/2007 | Zuo et al. | 16/354 |
| 2007/0174997 A1* | 8/2007 | Lu et al. | 16/367 |
| 2009/0282650 A1* | 11/2009 | Jin et al. | 16/367 |
| 2010/0071159 A1* | 3/2010 | Myung | 16/303 |
| 2011/0289728 A1* | 12/2011 | Wang et al. | 16/337 |
| 2012/0037777 A1* | 2/2012 | Nagao | 248/292.12 |
| 2012/0096678 A1* | 4/2012 | Zhang et al. | 16/302 |
| 2012/0212924 A1* | 8/2012 | Nakajima | 361/807 |
| 2012/0328222 A1* | 12/2012 | Chen et al. | 384/26 |
| 2013/0111704 A1* | 5/2013 | Mitsui | 16/250 |
| 2013/0139355 A1* | 6/2013 | Lee et al. | 16/354 |
| 2013/0152342 A1* | 6/2013 | Ahn et al. | 16/354 |

\* cited by examiner

ROTATING MECHANISM AND ELECTRONIC DEVICE WITH SAME

TECHNICAL FIELD

The disclosure generally relates to mechanisms, and more particularly to a rotating mechanism for rotating different portions of an electronic device.

DESCRIPTION OF RELATED ART

An electronic device may have two parts, wherein one part normally rotates relative to the other part, however, the rotation may only be about one axis, and the maximum rotation angle is usually less than 360 degrees. Thus, the rotation of one part to the other is restricted, and this limited rotation may fail to meet the desire of the consumer.

Therefore, it is desirable to provide a means which can overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding portions throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
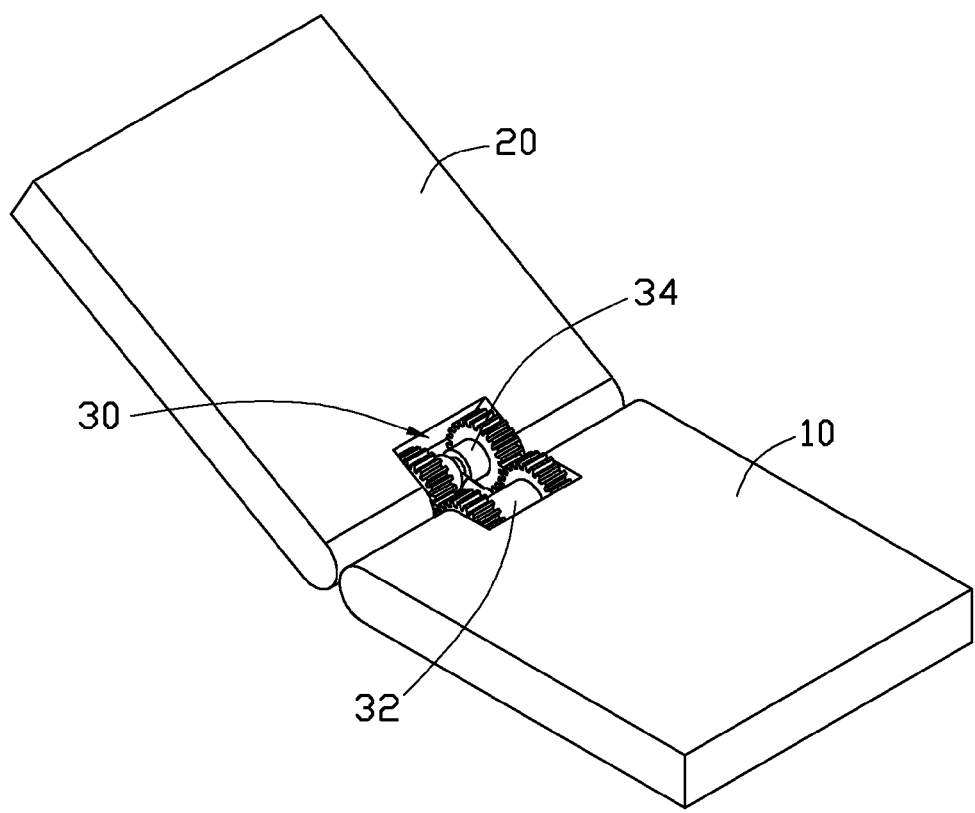
FIG. 1 is an isometric view of an electronic device in accordance with an exemplary embodiment of the present disclosure.

FIG. 1 illustrates an electronic device 1 in accordance with an exemplary embodiment. The electronic device 1 includes a first main body 10, a second main body 20, and a rotating mechanism 30 connecting the first main body 10 with the second main body 20 making the second main body 20 rotatable relative to the first main body 10. The second main body 20 can rotate about two different axes at or almost at 360 degrees. The electronic device 1 can be a portable device having a discrete display and a discrete input device, such as a flip phone or a notebook computer. The first main body 10 and the second main body 20 respectively correspond to the input device and the display of the portable device. In this embodiment, the electronic device 1 is a flip phone. The first main body 10 is a display screen of the flip phone. The second main body 20 is a keyboard of the flip phone.

Figure 2:
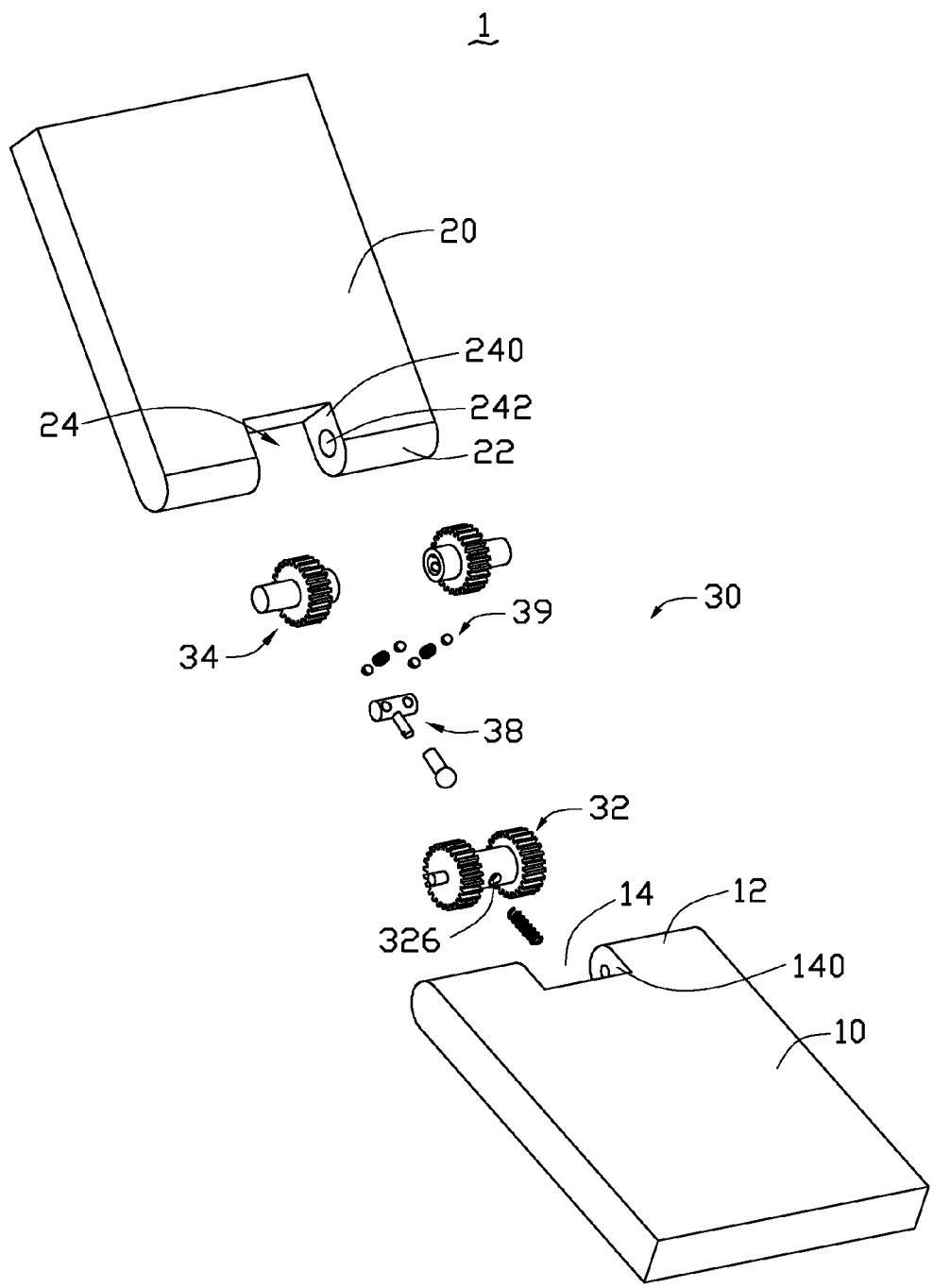
FIG. 2 is an exploded, isometric view of the electronic device of FIG. 1, viewed from a first direction, the electronic device including a main gear, a pair of auxiliary gears, a pair of positioning members, a connecting sleeve, and a connecting piece.
Figure 3:
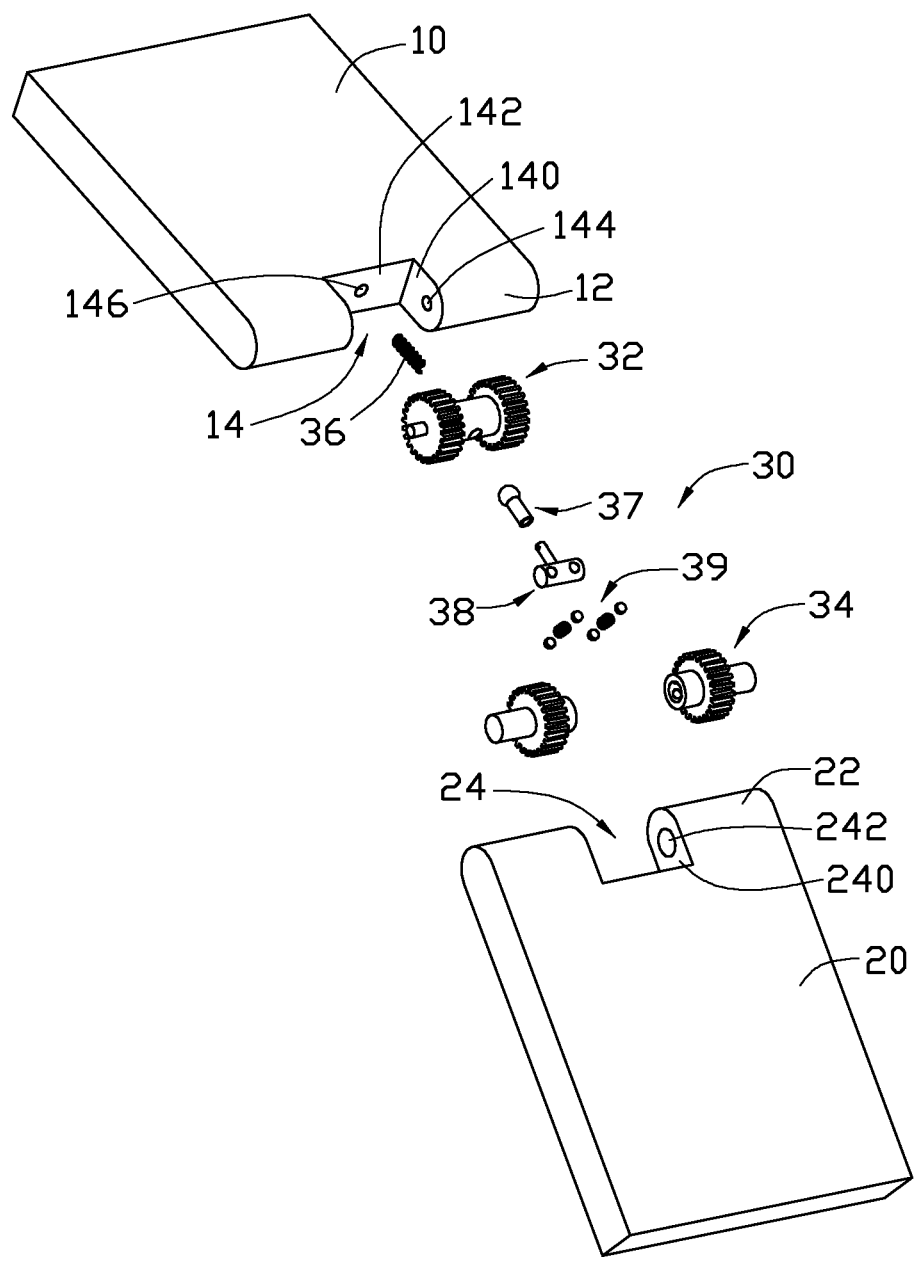
FIG. 3 is an exploded, isometric view of the electronic device of FIG. 1, viewed from a second direction.

FIGS. 2 and 3 show that the first main body 10 includes a first connecting peripheral 12 where the first main body 10 connects with the second main body 20. The first connecting peripheral 12 may be one of two opposite ends along a longitudinal direction of the first main body 10. The first connecting peripheral 12 may have a curve end surface, such as a half-cylindrical surface. A middle portion of the first connecting peripheral 12 is concave relative to the opposite side portions of the first connecting peripheral 12, so as to define a first groove 14. The first groove 14 may extend through two opposite surfaces of the first main body 10. The first groove 14 defines a pair of parallel first inner side surfaces 140 and a first inner end surface 142 perpendicularly connected to the pair of first inner side surfaces 140. A first connecting hole 144 is defined in each of the first inner side surfaces 140 and a locating hole 146 is defined in the first inner end surface 142.

The second main body 20 includes a second connecting peripheral 22 for connecting with the first main body 10. The second connecting peripheral 22 may be one of two opposite ends along a longitudinal direction of the second main body 20. The second connecting peripheral 22 may have a curve end surface, such as a half-cylindrical surface. A middle portion of the second connecting peripheral 22 is concave relative to the opposite side portions of second connecting peripheral 22. The second groove 24 may extend through two opposite surfaces of the second main body 20. The second groove 24 defines a pair of parallel second inner side surfaces 240. A second connecting hole 242 is defined in each of the second inner side surfaces 240.

The rotating mechanism 30 includes a main gear 32, a pair of auxiliary gears 34, a positioning spring 36, a connecting sleeve 37, a connecting piece 38, and a pair of positioning members 39.

Figure 4:
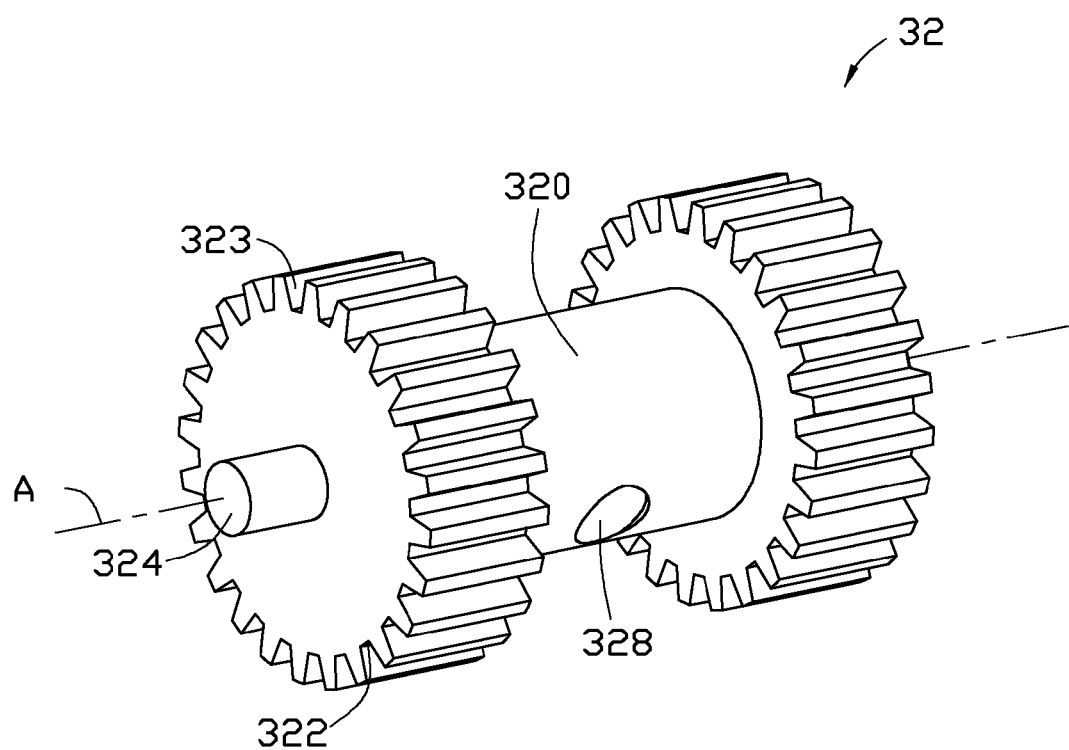
FIG. 4 is an enlarged, isometric view of the main gear of FIG. 2.

FIG. 4 shows the main gear 32 including a connecting section 320, a pair of first meshing sections 322 located at two opposite ends of the connecting section 320, and a pair of first connecting protrusions 324. Each of the first connecting protrusions 324 extends out from an outer end surface of a corresponding first meshing section 322. The connecting section 320, the first meshing sections 322, and the first connecting protrusions 324 are substantially cylindrical. The radius of the connecting section 320 is less than the radius of the first meshing section 322. Each of the first meshing sections 322 includes a number of first teeth 323 extending from a circumferential side surface of the first meshing section 322. The first teeth 323 are formed around an axial direction A of the main gear 32. The main gear 32 defines a positioning hole 326 (see FIG. 2) and a third connecting hole 328 in a circumferential side surface of the connecting section 320. The positioning hole 326 and the third connecting hole 328 are correspondingly located at two opposite ends of a diameter of the connecting section 320.

Figure 5:
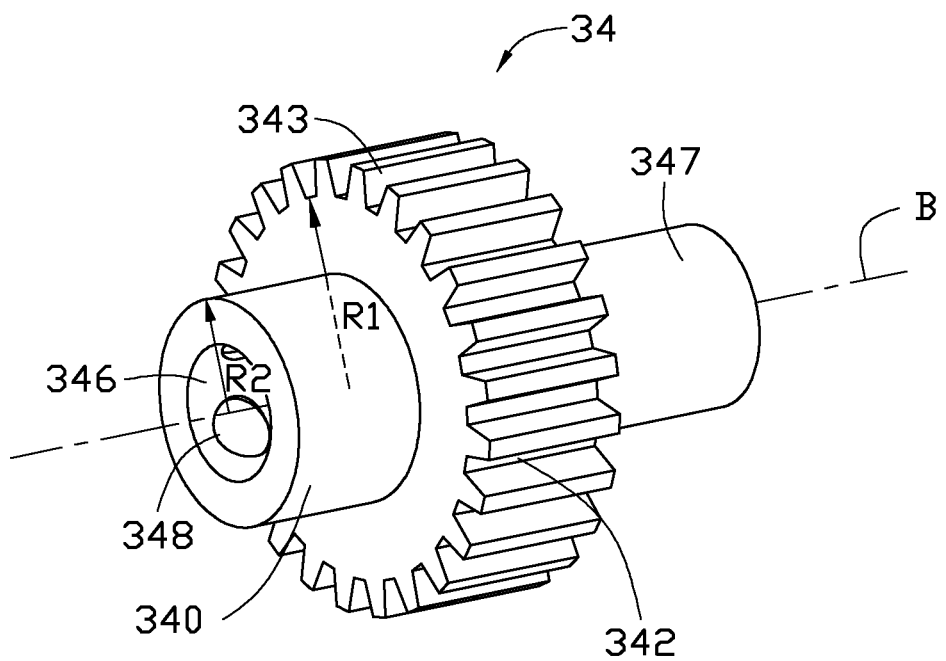
FIG. 5 is an enlarged, isometric view of the auxiliary gear of FIG. 2.

Referring to FIG. 5, each of the auxiliary gears 34 includes a cylindrical positioning section 340, a cylindrical second meshing section 342 surrounding an end of the positioning section 340, and a second connecting protrusion 347 extending from an outer surface of the second meshing section 342 away from the positioning section 340. The positioning section 340, the second meshing section 342, and the second connecting protrusion 347 are coaxial with each other. The radius R1 of the positioning section is less than the radius R2 of the second meshing section 342. The second meshing section 342 includes a number of second teeth 343 formed on a circumferential side surface thereof. The second meshing teeth 343 are formed around an axial direction B of the auxiliary gear 34. The auxiliary gear 34 defines a positioning groove 346 in an end surface of the positioning section 340 opposite to the second meshing section 342. The positioning groove 346 is substantially cylindrical and coaxial with the positioning section 340. The auxiliary gear 34 defines a number of evenly spaced locating recesses 348 in an inner side surface of the positioning groove 346, wherein the locating recesses 348 are arranged in a single circumferential line of the positioning groove 346.

Figure 6:
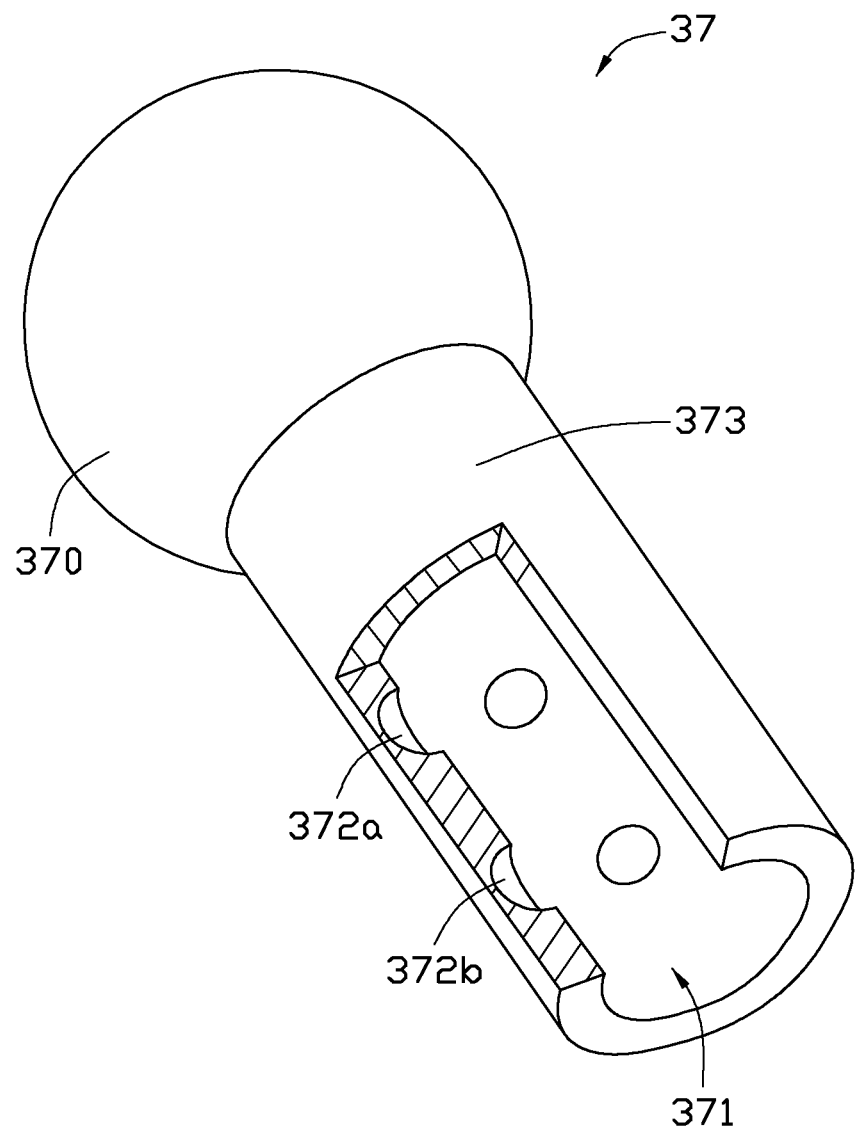
FIG. 6 is an enlarged, cutaway view of the connecting sleeve of FIG. 2.

FIG. 6 shows that the connecting sleeve 37 includes a hollow cylindrical main body 373 and a ball shaped joint 370 formed at one end of the main body 373. The connecting sleeve 37 defines an opening 371 at the other end of the main body 373 opposite to the ball shaped joint 370. The connecting sleeve 37 defines a number of evenly spaced first positioning recesses 372a and a number of evenly spaced second positioning recesses 372b in an inner side surface of the main body 373. The first positioning recesses 372a are arranged along a first circumferential line of the main body 373. The second positioning recesses 372b are arranged along a second circumferential line of the main body 373. The first circumferential line is closer to the ball shaped joint 370 than the second circumferential line.

Figure 7:
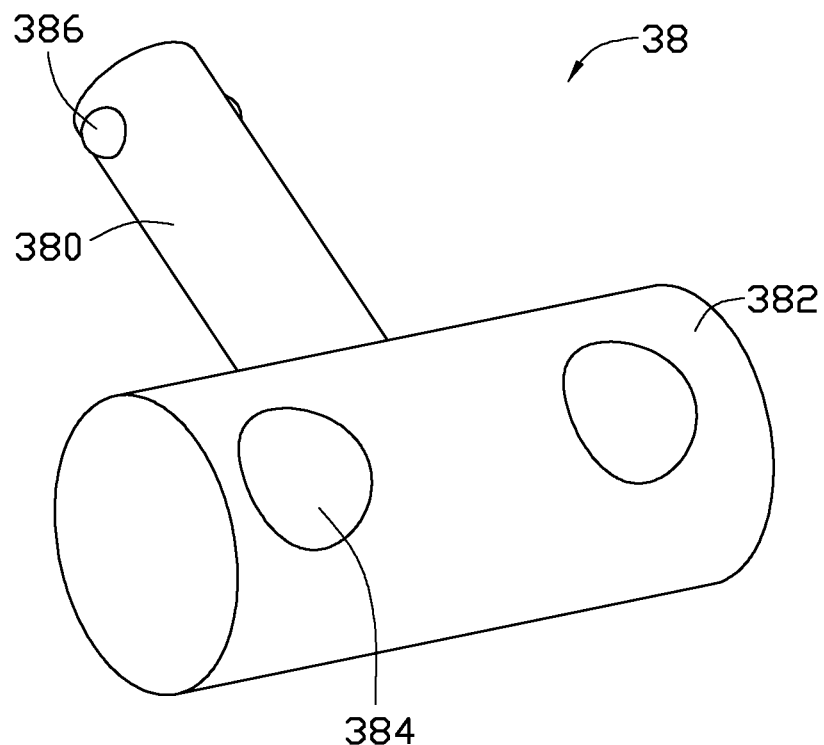
FIG. 7 is an enlarged, isometric view of the connecting piece of FIG. 2.

FIG. 7 shows that the connecting piece 38 includes a connecting part 380 and a positioning part 382 perpendicularly connected to the connecting part 380. The positioning part 382 is substantially a cylinder and defines a pair of positioning through holes 384. Each of the positioning through holes 384 passes through the positioning part 382 along a radial direction of the positioning part 382. The positioning through holes 384 are correspondingly close to two opposite end surfaces of the positioning part 382. The connecting part 380 is substantially a cylinder and extends from a middle of the positioning part 382 along the radial direction of the positioning part 382. The connecting part 380 includes a pair of positioning bumps 386 correspondingly extending from two opposite ends of a diameter of the connecting part 380.

Figure 8:
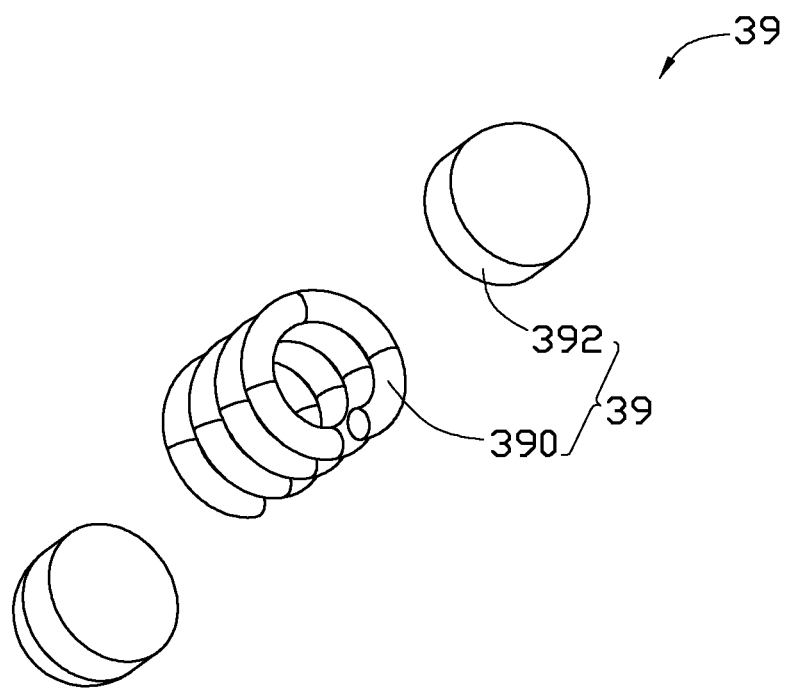
FIG. 8 is an enlarged, isometric view of the positioning members of FIG. 2.

FIG. 8 shows that each of the positioning members 39 includes a connecting spring 390 and a pair of positioning blocks 392 correspondingly connected to two opposite ends of the connecting spring 390.

Figure 9:
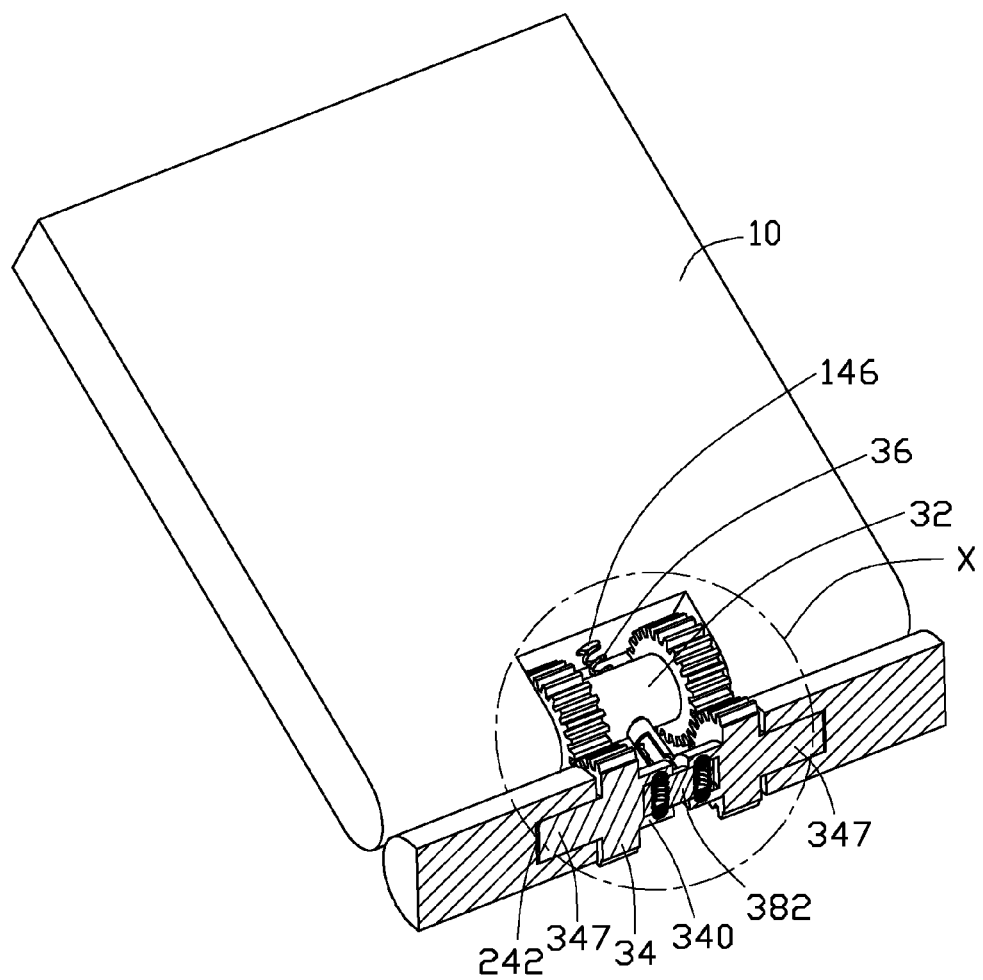
FIG. 9 is a cutaway view of FIG. 1, showing an assembly of the electronic device.
Figure 10:
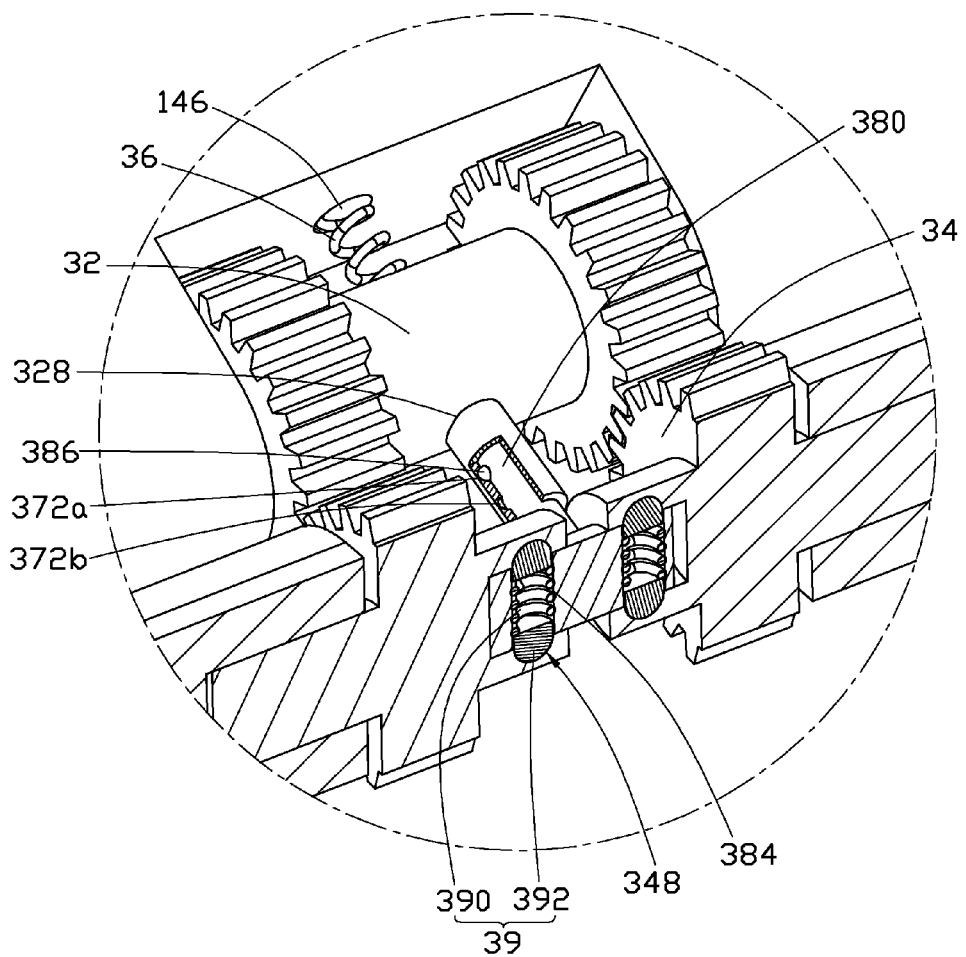
FIG. 10 is an enlarged view of a circled portion X of FIG. 9.

FIGS. 3, 9, and 10 show that in assembly, the main gear 32 is received in the first groove 14 by the first connecting protrusions 324 correspondingly inserted into the first connecting holes 144. One end of the positioning spring 36 is fixed in the locating hole 146. The other end of the positioning spring 36 is fixed in the positioning hole 326. The pair of auxiliary gears 34 are rotatably received in the second groove 24 by the second connecting protrusions 347 correspondingly inserted into the second connecting holes 242. The positioning members 39 are correspondingly received in the positioning through holes 384. Two opposite ends of the positioning part 382 which the positioning members 39 are received in are correspondingly inserted into the positioning grooves 346. The positioning blocks 392 correspondingly extend out of two opposite openings of the positioning through hole 384 and are resiliently inserted into the locating recesses 348. The ball shaped joint 370 is pivotably received in the third connecting hole 328. The connecting part 380 is inserted into the connecting sleeve 37 by the positioning bumps 386 correspondingly inserted into the first positioning recesses 372a or the second positioning recesses 372b.

When the positioning bumps 386 are inserted into the first positioning recesses 372a, the first teeth 323 on the first meshing sections 322 engage with the second teeth 343 on the second meshing section 342 to make the first main body 10 rotate about the second main body 20. During the rotation, the positioning blocks 392 are resiliently inserted into or orderly removed from the locating recesses 348 to position the relative rotation angle between the first main body 10 and the second main body 20.

Figure 11:
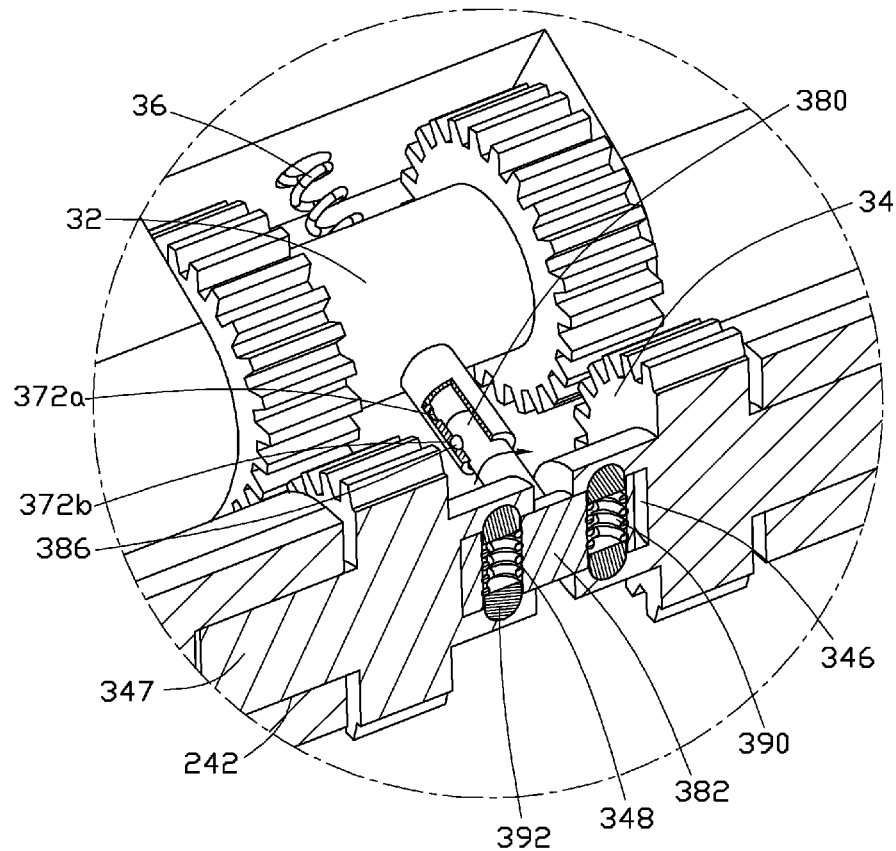
FIG. 11 is similar to FIG. 10, but showing a rotation of the electronic device when the main gear is separated from the auxiliary gears.

FIG. 11 shows that the connecting piece 38 is pulled away from the opening 371 of the connecting sleeve 37 to make the positioning bumps 386 insert into the second positioning recesses 372b. The main gear 32 is separated from the auxiliary gears 34. The first main body 10 and the second main body 20 are independently rotated about an axial direction of the connecting part 380. During the rotation, the positioning bumps 386 are forcibly inserted into or orderly removed from the second positioning recesses 372b to position the relative rotation angle between the first main body 10 and the second main body 20.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A rotating mechanism for rotatably connecting a first main body with a second main body, the rotating mechanism comprising:
   a main gear connected to the first main body, the main gear comprising a connecting section, a pair of first meshing sections correspondingly formed at two opposite ends of the connecting section, and a pair of connecting protrusions correspondingly extending from an outer end surface of each first meshing section opposite to the connecting section and connecting to the first main body, each of the first meshing sections comprising a plurality of first teeth formed around an axial direction of the main gear;
   a pair of auxiliary gears correspondingly connected to the second main body, longitudinal axes of the pair of auxiliary gears coaxial with each other, each of the auxiliary gears comprising a positioning section, a second meshing section surrounding an end of the positioning section, and a second connecting protrusion extending from an outer surface of the second meshing section away from the positioning section and connecting to the second main body, the second meshing section comprising a plurality of second teeth formed around an axial direction of the auxiliary gears; and
   a connecting piece comprising a positioning part and a connecting part perpendicularly extending from a middle of the positioning part, the connecting part directly connected to the positioning part; wherein the positioning part is located between the pair of auxiliary gears, two opposite ends of the positioning part are rotatably connected to the positioning sections correspondingly, an end of the connecting part away from the positioning part is connected to the connecting section; a biasing means brings the main gear in contact with the auxiliary gears, and the first teeth engage with the second teeth to make the first main body rotate about the second main body.

2. The rotating mechanism of claim 1, wherein each of the pair of auxiliary gears defines a positioning groove in an end surface of the positioning section opposite to the second meshing section and a plurality of evenly spaced locating recesses in an inner side surface of the positioning groove along a circumferential line of the positioning groove, the opposite ends of the positioning part are rotatably received in the positioning grooves, the connecting piece further comprises a pair of positioning members correspondingly set on the opposite ends of the positioning part received in the positioning grooves, and the positioning members engage with the locating recesses for positioning the relative rotation angle between the first main body and the second main body.

3. The rotating mechanism of claim 2, wherein the radius of the positioning section is less than the radius of the second meshing section.

4. The rotating mechanism of claim 2, wherein the positioning groove is coaxial with the positioning section.

5. The rotating mechanism of claim 2, wherein each of the positioning members comprises a connecting spring and a pair of positioning blocks correspondingly connected to two opposite ends of the connecting spring, the positioning part defines a pair of positioning through holes along a radial direction of the positioning part, the pair of positioning through holes are correspondingly close to two opposite end surfaces of the positioning part, and the positioning members are correspondingly received in the positioning through holes with the positioning blocks extending out of the positioning through holes and resiliently inserted into the locating recesses.

6. The rotating mechanism of claim 1, further comprising a connecting sleeve connecting the connecting piece with the main gear, the connecting sleeve comprising a hollow main body and a ball shaped joint formed at one end of the main body and defining an opening receiving the connecting piece at the other end of the main body opposite to the ball shaped joint, the biasing means being disposed between the first main body and the ball shaped joint.

7. The rotating mechanism of claim 6, wherein the connecting sleeve defines a plurality of evenly spaced first positioning recesses and a plurality of evenly spaced second positioning recesses in an inner side surface of the main body, the first positioning recesses are closer to the ball shaped joint than the second positioning recesses, the first positioning recesses are arranged along a first circumferential line of the main body, the second positioning recesses are arranged along a second circumferential line of the main body, the first circumferential line is closer to the ball shaped joint than the second circumferential line, the connecting part comprises a pair of positioning bumps correspondingly extending from two opposite ends of a diameter of the connecting part, and the positioning bumps are selectively inserted into the first positioning recesses or the second positioning recesses to position the connecting piece.

8. The rotating mechanism of claim 7, wherein when the positioning bumps are inserted into the first positioning recesses, the first teeth engage with the second teeth to make the first main body rotate relatively about the second main body.

9. The rotating mechanism of claim 7, wherein when the positioning bumps are inserted into the second positioning recesses, the main gear is separated from the auxiliary gears, and the first main body and the second main body independently rotate about an axial direction of the connecting part.

10. An electronic device comprising:
a first main body comprising a first connecting peripheral and defining a first groove in the first connecting peripheral, the first groove defining a pair of parallel first inner side surfaces;
a second main body comprising a second connecting peripheral and defining a second groove in the second connecting peripheral, the second groove defining a pair of parallel second inner side surfaces; and
a rotating mechanism rotatably connecting the first main body with the second main body, the rotating mechanism comprising:
a main gear received in the first groove, the main gear comprising a connecting section, a pair of first meshing sections correspondingly formed at two opposite ends of the connecting section, and a pair of connecting protrusions correspondingly extending from an outer end surface of each first meshing section opposite to the connecting section, the connecting protrusions correspondingly connected to the pair of first inner side surfaces and connecting to the first main body, and each of the first meshing sections comprising a plurality of first teeth formed around an axial direction of the main gear;
a pair of auxiliary gears correspondingly connected to the pair of second inner side surfaces, longitudinal axes of the pair of auxiliary gears coaxial with each other, each of the auxiliary gears comprising a positioning section, a second meshing section surrounding an end of the positioning section, and a second connecting protrusion extending from an outer surface of the second meshing section away from the positioning section and connecting to the second main body, the second meshing section comprising a plurality of second teeth formed around an axial direction of the auxiliary gears; and
a connecting piece comprising a positioning part and a connecting part perpendicularly extending from a middle of the positioning part, the connecting part directly connected to the positioning part;
wherein the positioning part is located between the pair of auxiliary gears, two opposite ends of the positioning part rotatably connected to the positioning sections correspondingly, an end of the connecting part away from the positioning part is connected to the connecting section; a biasing means brings the main gear in contact with the auxiliary gears, and the first teeth engage with the second teeth to make the first main body rotate about the second main body.

11. The electronic device of claim 10, further comprising a positioning spring, wherein the first groove further defines an inner end surface perpendicular to the parallel first inner side surfaces, the first main body defines a locating hole in the inner end surface, the main gear defines therein a positioning hole between the pair of first meshing sections, wherein and two opposite ends of the positioning spring are correspondingly fixed in a bottom of the locating hole and a bottom of the positioning hole.

12. The electronic device of claim 10, wherein each of the pair of auxiliary gears defines a positioning groove in an end surface of the positioning section opposite to the second meshing section and a plurality of evenly spaced locating recesses in an inner side surface of the positioning groove along a single circumferential line of the positioning groove, the opposite ends of the positioning part are rotatably received in the positioning grooves, the connecting piece further comprises a pair of positioning members correspondingly set on the opposite ends of the positioning part received in the positioning grooves, and the positioning members engage with the locating recesses for positioning the relative rotation angle between the first main body and the second main body.

13. The electronic device of claim 12, wherein the radius of the positioning section is less than the radius of the second meshing section, and the positioning groove is coaxial with the positioning section.

14. The electronic device of claim 12, wherein each of the positioning members comprises a connecting spring and a pair of positioning blocks correspondingly connected to two opposite ends of the connecting spring, the positioning part defines a pair of positioning through holes passing through a radial direction of the positioning part, the pair of positioning through holes are correspondingly close to two opposite end surfaces of the positioning part, and the positioning members are correspondingly received in the positioning through holes with the positioning blocks extending out of the positioning through holes and resiliently inserted into the locating recesses.

15. The electronic device of claim 10, further comprising a connecting sleeve connecting the connecting piece with the main gear, the connecting sleeve comprising a hollow main body and a ball shaped joint formed at one end of the main body and defining an opening receiving the connecting piece at the other end of the main body opposite to the ball shaped joint, the biasing means being disposed between the first main body and the ball shaped joint.

16. The electronic device of claim 15, wherein the connecting sleeve defines a plurality of evenly spaced first positioning recesses and a plurality of evenly spaced second positioning recesses in an inner side surface of the main body, the first positioning recesses are closer to the ball shaped joint than the second positioning recesses, the first positioning recesses and the second positioning recesses are arranged along a circumferential line of the main body, the connecting part comprises a pair of positioning bumps correspondingly extending from two opposite ends of a diameter of the connecting part, and the positioning bumps are selectively inserted into the first positioning recesses or the second positioning recesses to position the connecting piece.

17. The electronic device of claim 16, wherein when the positioning bumps are inserted into the first positioning recesses, and the first teeth engage with the second teeth to make the first main body rotate relatively about the second main body.

18. The electronic device of claim 16, wherein when the positioning bumps are inserted into the second positioning recesses, the main gear is separated from the auxiliary gears, and the first main body and the second main body independently rotate about an axial direction of the connecting part.

19. A rotating mechanism for rotatably connecting a first main body with a second main body, the rotating mechanism comprising:
a main gear connected to the first main body, the main gear comprising a connecting section, a pair of first meshing sections correspondingly formed at two opposite ends of the connecting section, and a pair of connecting protrusions correspondingly extending from an outer end surface of each first meshing section opposite to the connecting section and connecting to the first main body, each of the first meshing sections comprising a plurality of first teeth formed around an axial direction of the main gear;
a pair of auxiliary gears correspondingly connected to the second main body, longitudinal axes of the pair of auxiliary gears coaxial with each other, each of the auxiliary gears comprising a positioning section, a second meshing section surrounding an end of the positioning section, and a second connecting protrusion extending from an outer surface of the second meshing section away from the positioning section and connecting to the second main body, the second meshing section comprising a plurality of second teeth formed around an axial direction of the auxiliary gears;
a connecting piece comprising a positioning part and a connecting part perpendicularly extending from a middle of the positioning part, the connecting part directly connected to the positioning part; and
a connecting sleeve connecting the connecting piece with the main gear, the connecting sleeve comprising a hollow main body and a ball shaped joint formed at one end of the main body and defining an opening receiving the connecting piece at the other end of the main body opposite to the ball shaped joint;
wherein the positioning part is located between the pair of auxiliary gears, two opposite ends of the positioning part are rotatably connected to the positioning sections correspondingly, an end of the connecting part away from the positioning part is rotatably received in the hollow main body of the connecting sleeve, the ball shaped joint is jointly connected to the main gear; a biasing means brings the main gear in contact with the auxiliary gears, and the first teeth engage with the second teeth to make the first main body rotate about the second main body, the biasing means being disposed between the first main body and the ball shaped joint.

* * * * *